(12) United States Patent
Mason et al.

(10) Patent No.: US 12,221,880 B2
(45) Date of Patent: Feb. 11, 2025

(54) POWER CONSERVATION IN ACOUSTIC TELEMETRY

(71) Applicant: ACOUSTIC DATA LIMITED, Eden Island (SC)

(72) Inventors: Guy Harvey Mason, Eden Island (SC); James Andrew Gulliver, Eden Island (SC); Matthew David Bolsover, Eden Island (SC); Mark Clifton Tolley, Eden Island (SC)

(73) Assignee: Acoustic Data Limited, Eden Island (SC)

( * ) Notice: Subject to any disclaimer, the term of this patent is extended or adjusted under 35 U.S.C. 154(b) by 0 days.

(21) Appl. No.: 18/278,662

(22) PCT Filed: Mar. 1, 2022

(86) PCT No.: PCT/IB2022/051772
§ 371 (c)(1),
(2) Date: Aug. 24, 2023

(87) PCT Pub. No.: WO2022/185191
PCT Pub. Date: Sep. 9, 2022

(65) Prior Publication Data
US 2024/0309757 A1    Sep. 19, 2024

(30) Foreign Application Priority Data
Mar. 2, 2021   (GB) ...................................... 2102933

(51) Int. Cl.
*E21B 47/16*   (2006.01)
*H04Q 9/00*    (2006.01)

(52) U.S. Cl.
CPC .............. *E21B 47/16* (2013.01); *H04Q 9/00* (2013.01); *H04Q 2209/883* (2013.01); *H04Q 2209/886* (2013.01)

(58) Field of Classification Search
CPC .......... E21B 47/12; E21B 47/14; E21B 47/16; H04Q 9/00; H04Q 2209/883; H04Q 2209/886
See application file for complete search history.

(56) References Cited

U.S. PATENT DOCUMENTS 4,111,035 A * 9/1978 West ..................... G01L 23/225
                                                          73/35.05
4,215,427 A * 7/1980 Waggener ............... E21B 47/18
                                                          375/329

(Continued)

FOREIGN PATENT DOCUMENTS

WO    2010030945 A1    3/2010
WO    2015153537 A1    10/2015

OTHER PUBLICATIONS

Corresponding International Search Report for Patent Application No. PCT/IB2022/051772, mailed Aug. 2, 2022, 8 pages.

(Continued)

*Primary Examiner* — Franklin D Balseca
(74) *Attorney, Agent, or Firm* — Cooper Legal Group LLC

(57) ABSTRACT

An acoustic telemetry unit comprising an acoustic receiver for receiving acoustic telemetry signals is disclosed. The acoustic telemetry unit comprises a filter for filtering signals received by the acoustic receiver, a processor for processing signals passed by the filter to recover a data signal, the processor being operable in a sleep mode, and means for waking the processor from the sleep mode in dependence on an output of the filter. An energy storage module may be charged using signals received by the acoustic receiver which are not passed by the filter. The disclosed techniques may help to conserve battery power.

18 Claims, 8 Drawing Sheets

(56) References Cited

U.S. PATENT DOCUMENTS

Figure 1:
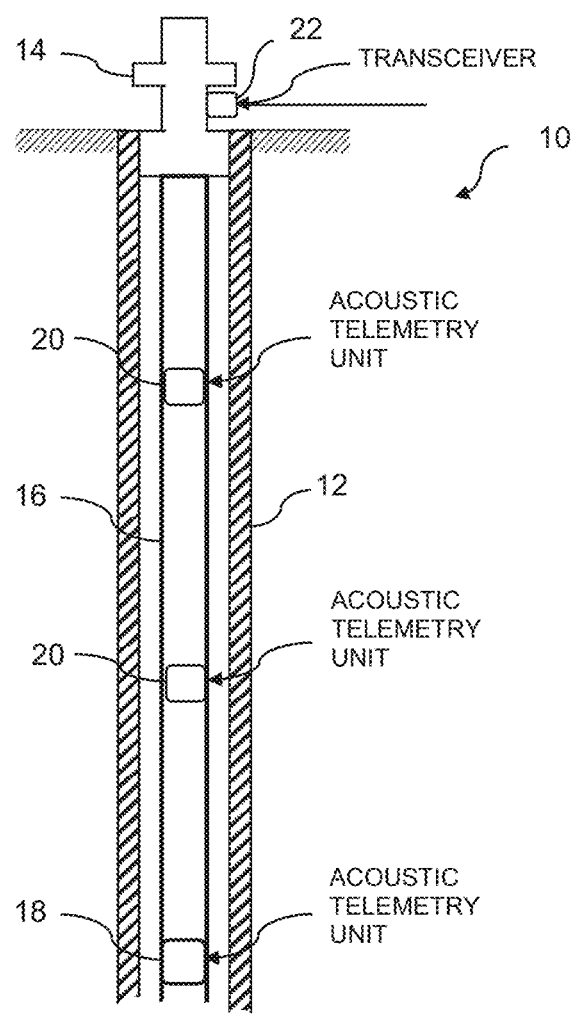

| | | | |
|---|---|---|---|
| 6,998,999 B2 * | 2/2006 | Fripp | E21B 47/14 |
| | | | 340/854.3 |
| 10,436,026 B2 * | 10/2019 | Ounadjela | G01V 1/288 |
| 10,487,647 B2 * | 11/2019 | Song | E21B 47/16 |
| 2006/0016606 A1 * | 1/2006 | Tubel | E21B 41/0085 |
| | | | 166/177.6 |
| 2017/0131222 A1 * | 5/2017 | Zalbide Agirrezabalaga | |
| | | | G01D 21/00 |
| 2018/0058208 A1 | 3/2018 | Song et al. | |
| 2019/0112916 A1 | 4/2019 | Song et al. | |
| 2019/0170570 A1 | 6/2019 | Schmidt et al. | |

OTHER PUBLICATIONS

Corresponding UKIPO Search Report for application No. GB2102933.5, mailed Dec. 2, 2021, 4 pages.
Corresponding Written Opinion for Patent Application No. PCT/IB2022/051772, mailed Aug. 2, 2022, 10 pages.

* cited by examiner

POWER CONSERVATION IN ACOUSTIC TELEMETRY

The present invention relates to techniques for power conservation in acoustic telemetry, and in particular but not exclusively to techniques for extending the battery life of acoustic telemetry equipment in tubular structures, such as those found in wellbores.

In the oil and gas industry it is often desirable to sense downhole parameters and to transmit the sensed data to the surface. To this end, sensors, such as pressure, density and/or temperature sensors, are commonly deployed in bore holes using a number of methods and the data is retrieved in a variety of ways including acoustic transmission between the subterranean sensor and a surface data acquisition system.

Acoustic transmission techniques involve sending a series of coded sound signals via the materials lining the wellbore. In order to compensate for the decreasing strength of the acoustic signal as it travels through the wellbore, repeater units may be deployed at intervals through the wellbore. Each repeater unit consists of an acoustic receiver and an acoustic transmitter coupled to the wellbore. The receiver and transmitter are housed in a pressure resistant housing. The unit may also include sensors, control and measurement electronics, and memory for data storage. The entire unit is typically powered by a set of temperature resistant batteries.

Acoustic transmission between repeaters is usually limited to a certain range of frequencies that are known or determined in situ to provide least attenuation via the wellbore tubulars. However, the sonic vibrations present in the wellbore extend over a wide range of frequencies and may be caused variously by fluid flow and mechanical equipment. For this reason, the received acoustic signal will typically pass through a band pass and/or anti-aliasing filter in order to reject frequencies that are not of interest.

Prolonging the useful life of the equipment in the wellbore is generally desirable for economic and logistical reasons. Various electronic designs have therefore been proposed to extend battery life. One known technique involves the electronic circuits going into a low power "sleep" mode when there is no planned activity. The circuits are placed in a low power mode and a separate alarm clock circuit running on very low power is programmed to wake up the main processor and peripherals at a pre-determined time. A disadvantage of such an arrangement is that the controlling algorithms must know in advance when the equipment is likely to receive a signal from another downhole unit. As a consequence, data can only be transmitted during certain predetermined time windows, which limits the flexibility of the system to transmit data at different times. Furthermore, the clock circuit may be perturbed by temperature effects causing the electronic clocks on each unit to drift at different rates over time. Running the alarm clock and waking up early enough to compensate for potential drift are undesirable uses of battery power.

US 2018/0058208 A1, the subject matter of which is incorporated herein by reference, discloses a downhole wireless telemetry system which includes a plurality of battery-powered intermediate communications nodes spaced along a downhole tubular body. Each of the intermediate communications nodes is configured to alternate between a sleep mode and an active mode. A topside communications node is arranged to send an acoustic signal to an intermediate communications node to place it in the active mode. The intermediate communications node includes a separate vibration resonator which receives the acoustic signal from the topside communications node.

A disadvantage of the arrangement disclosed in US 2018/0058208 A1 is that it requires additional topside equipment as well as additional components in the intermediate communications node in order to transmit and receive the wake-up signal, all of which adds to the cost and complexity of the system. Furthermore, the top side node may not be aware of when a downhole communications node wishes to transmit, which may limit the flexibility of the system to transmit data at different times. It may also be difficult for the topside communications node to communicate with an intermediate communications node which is deep in the wellbore, which may make the system unsuitable for use with deep wellbores.

It would therefore be desirable to provide techniques for conserving battery power in acoustic telemetry systems that can provide greater flexibility in the times at which data can be transmitted, which do not add significant cost or complexity to the system, which can be used in wellbores of varying depths, which do not require a separate alarm clock circuit and/or which are less sensitive to drift in clock circuits over time.

According to one aspect of the present invention there is provided an acoustic telemetry unit comprising:
 an acoustic receiver for receiving acoustic telemetry signals;
 a filter for filtering signals received by the acoustic receiver;
 a processor for processing signals passed by the filter to recover a data signal, the processor being operable in a sleep mode; and
 means for waking the processor from the sleep mode in dependence on an output of the filter.

The present invention may provide the advantage that, by providing means for waking the processor from the sleep mode in dependence on an output of the filter, it may be possible for the processor to be woken at a time when data is being transmitted by another downhole acoustic telemetry unit. This may allow the processor to be in an active mode when data communication is in process, while being in the sleep mode at other times. This may help to conserve battery power, while providing flexibility in the times at which data can be communicated. Furthermore, this may be achieved using at least some existing components, such as an acoustic receiver and filter which are used for data communication, thereby minimising any additional cost or complexity. In addition, the present invention may avoid the need to provide a separate alarm clock circuit and/or reduce sensitivity to clock drift. The present invention may also provide the advantage that it can be used in wellbores of varying depths.

Preferably the filter is arranged to pass signals within a predetermined passband and/or to suppress signals outside the predetermined passband. The passband may be a transmission band within which acoustic communications take place. Thus, the filter may have a passband corresponding to frequencies used for acoustic communication. This may allow the acoustic receiver and filter which are used for data communication also to be used to wake the processor from the sleep mode.

In a preferred embodiment the filter is passive filter. This may provide the advantage that the filter can continue to operate even when the unit is in a low power mode, using for example energy from the acoustic receiver. For example, the filter may comprise a tuned circuit, such as an inductor and a capacitor connected in parallel, although other types of passive filter, such as an LC filter, an RC filter or a multi-element filter could be used instead. Where the filter is a tuned circuit, it preferably has a resonant frequency corresponding to frequencies used for acoustic communications.

Alternatively, in some embodiments, a digital filter could be used as well or instead.

Preferably the means for waking the processor comprises a detector for detecting when a signal is passed by the filter. The detector may be arranged to detect when a time integration of a signal passed by the filter is above a predetermined threshold. This may allow the detector to detect when a real, persistent acoustic telemetry signal is received, while helping to avoid false positives which may be caused, for example, by acoustic noise.

In a preferred embodiment, the detector comprises an energy storage device arranged to store electrical energy passed by the filter. This may allow electrical energy passed by the filter to be accumulated, and thus may allow the detector to detect when a real, persistent acoustic telemetry signal is received using passive components. The electrical storage device is preferably a capacitor, although other types of storage device such as one or more electrochemical cells could be used instead or as well.

Preferably the detector comprises a threshold detector arranged to detect when electrical energy stored on the energy storage device exceeds a threshold. For example, where the energy storage device is a capacitor, the threshold detector may detect when a voltage of the capacitor exceeds a threshold. This may allow the detector to determine when a real, persistent acoustic telemetry signal is received. The threshold may be set in advance and/or adjusted in dependence, for example, on the acoustic environment in which the telemetry unit is being used.

Preferably the means for waking the processor comprises a wake-up circuit configured to wake the processor when the detector detects a signal passed by the filter. The wake-up circuit may also wake up other components of the acoustic telemetry unit, such as peripherals, memory for data storage, sensors, control and measurement electronics and/or communication devices. The wake-up circuit may be operable, for example, to remove power from components in a sleep mode and/or to restore power to components in an active mode. Alternatively, or in addition, the wake-up circuit may be operable to activate and/or to deactivate a built-in sleep mode in the processor and/or other component, for example, by sending a command.

Where a wake-up circuit is provided, the detector may comprise a switching device arranged to turn on the wake-up circuit when a signal passed by the filter is detected. For example, where the detector comprises a capacitor arranged to store electrical energy passed by the filter, the switching device may be arranged turn on the wake-up circuit when the voltage of the capacitor exceeds a threshold (which may be fixed or variable).

In one possible embodiment, the detector is arranged to compare a signal which is passed by the filter with a signal which is not passed by the filter. In this case, the threshold used by the threshold detector may in effect be variable in dependence on signals which are not passed by the filter. For example, the detector may comprise a first energy storage device (such as a first capacitor) arranged to store electrical energy passed by the filter, a second energy storage device (such as a second capacitor) arranged to store electrical energy not passed by the filter, and a comparator for comparing energy stored by the first and second devices (for example, by comparing voltages). This may help to prevent false positives which may occur due to acoustic noise such as may be produced, for example, by fluid flow or mechanical equipment.

The acoustic telemetry unit may further comprise a voltage multiplier arranged to multiply a voltage at the output of the filter. This can allow a relatively low voltage produced by the acoustic receiver to be converted to a higher voltage suitable for use by the detector. The voltage multiplier may comprise, for example, a series of capacitor-diode stages, such as a Cockroft-Walton ladder, which may convert a low alternating voltage produced by the acoustic receiver (and filtered by the filter) into a higher voltage suitable for use by electrical components in the detector, although other types of voltage multiplier could be used as well or instead.

In a preferred embodiment, the acoustic telemetry unit further comprises:
   an energy storage module for supplying electrical power to the acoustic telemetry unit; and
   means for charging the energy storage module using signals received by the acoustic receiver which are not passed by the filter.

This embodiment may provide the advantage that signals from the acoustic receiver can be filtered in such a way as to trigger a wake-up circuit and simultaneously top up the battery charge. Thus, this embodiment may help to further extend battery life by topping up the battery charge using acoustic energy which would otherwise be wasted. In this embodiment, the filter is preferably a passive and/or analogue filter, and the energy storage module is preferably rechargeable. It will be appreciated that the battery charge may also be topped up when the unit is not in sleep mode.

This aspect of the invention may also be provided independently. Thus, according to another aspect of the invention there is provided an acoustic telemetry unit comprising:
   an acoustic receiver for receiving acoustic telemetry signals;
   a filter for filtering signals received by the acoustic receiver;
   a processor for processing signals passed by the filter to recover a data signal;
   an energy storage module for supplying electrical power to the acoustic telemetry unit; and
   means for charging the energy storage module using signals received by the acoustic receiver which are not passed by the filter.

This aspect of the invention may provide the advantage that signals from the acoustic receiver that are not of interest, and whose energy would otherwise be wasted, can be used to charge the energy storage module, thereby prolonging its life.

The means for charging the energy storage module may comprise a charge storage device arranged to store charge produced by the acoustic receiver which is not passed by the filter. This may allow the relatively small amounts of charge which are produced by the acoustic receiver (and not passed by the filter) to be accumulated until they are at a level suitable for charging the energy storage module. The charge storage device may be for example a capacitor or any other suitable device such as an electrochemical cell.

Typically, the signals which are received by the acoustic receiver will be AC (alternating current) signals. Thus, the acoustic telemetry unit may further comprise an AC to DC (direct current) converter (for example a rectifier) for converting an AC signal received by the acoustic receiver to a DC signal for supply to the charge storage device.

The AC to DC converter may be any suitable device, such as a diode or a bridge rectifier. However, in a preferred embodiment, the AC to DC converter comprises a charge pump. The charge pump is preferably operable to rectify the AC signal and to increase its voltage. An advantage of using a charge pump is that it can be arranged to conduct with only a very small voltage present at the input and thus avoid the situation where a forward bias voltage of a semiconductor diode would need to be overcome. Furthermore, the charge pump may help to bring the voltage up to a suitable level for charging the energy storage module. The charge pump may comprise, for example, an amplifier (such as an operational amplifier) and a switching device (such a transistor) arranged to present the appropriate cycle of the AC signal to the charge storage device (which may be a capacitor). This can allow the charge on the charge storage device to increase monotonically, until it is discharged into the energy storage device. Preferably, the AC to DC converter comprises two charge pumps, one for each cycle of the AC signal.

The means for charging the energy storage module may further comprise means for discharging the charge storage device into the energy storage module. For example, a charge stored on the charge storage device may be discharged into the energy storage module when it has reached a certain value. This may be achieved, for example, using a switching device such as transistor to drain the charge stored on the charge storage device into the energy storage module. This may be done, for example, when the voltage of the charge storage device exceeds a predetermined threshold.

Depending on the type of energy storage module, the charge pump may be enough to bring the voltage on the charge storage device to the required level. However, in some situations, the voltage on the charge storage device may be different from that required to charge the energy storage module. Thus, the means for charging the energy storage module may further comprise a DC to DC converter arranged to convert a voltage of the charge storage device to a voltage for charging the energy storage module. The DC to DC converter may be, for example, a boost converter to increase the voltage on the charge storage device to a suitable level.

The energy storage module may be for example a battery pack or any other suitable form of electrical energy storage such as one or more capacitors (which might be super capacitors or ultracapacitors). In the case of a battery pack, the battery pack may comprise one or more rechargeable electrochemical cells and optionally a control circuit to control charge and/or discharge or the cells. The energy storage module is preferably used to supply at least some of the electrical power for the acoustic telemetry unit.

In any of the above arrangements, the acoustic receiver may comprise a transducer for converting acoustic signals to electrical signals. The transducer may comprise, for example, one or more piezoelectric elements. In one embodiment, the transducer comprises a piezoceramic stack, although other suitable devices could be used instead.

In a preferred embodiment, the acoustic telemetry unit is for use in a wellbore. Thus, the acoustic receiver may be arranged to receive an acoustic signal from a tubular (such as production or drilling tubing) in a wellbore. For example, the acoustic receiver may be acoustically coupled to wellbore tubing in order to receive acoustic telemetry signals transmitted through the wellbore tubing.

In a preferred embodiment, the acoustic telemetry unit is a repeater unit for repeating acoustic telemetry signals, for example, acoustic telemetry signals transmitted through wellbore tubing. Thus, the acoustic telemetry unit may further comprise an acoustic transmitter for transmitting acoustic telemetry signals. For example, the acoustic trans-mitter may be arranged to transmit acoustic telemetry signals containing data recovered from the received acoustic telemetry signals. The acoustic transmitter and the acoustic receiver may be separate devices, or a single device, or some combination thereof.

According to another aspect of the invention there is provided an acoustic telemetry system comprising a plurality of acoustic telemetry units in any of the forms described above.

Corresponding methods may also be provided. Thus, according to another aspect of the invention, there is provided a method of operating an acoustic telemetry unit, the method comprising the steps of:
  receiving acoustic telemetry signals;
  filtering signals received in the receiving step;
  processing signals passed in the filtering step to recover a data signal; and
  waking the acoustic telemetry unit from a sleep mode in dependence on signals passed in the filtering step.

According to another aspect of the invention there is provided a method of operating an acoustic telemetry unit, the method comprising the steps of:
  receiving acoustic telemetry signals;
  filtering signals received in the receiving step;
  processing signals passed in the filtering step to recover a data signal;
  supplying power to the acoustic telemetry unit from an energy storage module; and
  charging the energy storage module using signals which are not passed in the filtering step.

Features of one aspect of the invention may be used with any other aspect. Any of the apparatus features may be provided as method features and vice versa.

Figure 2:
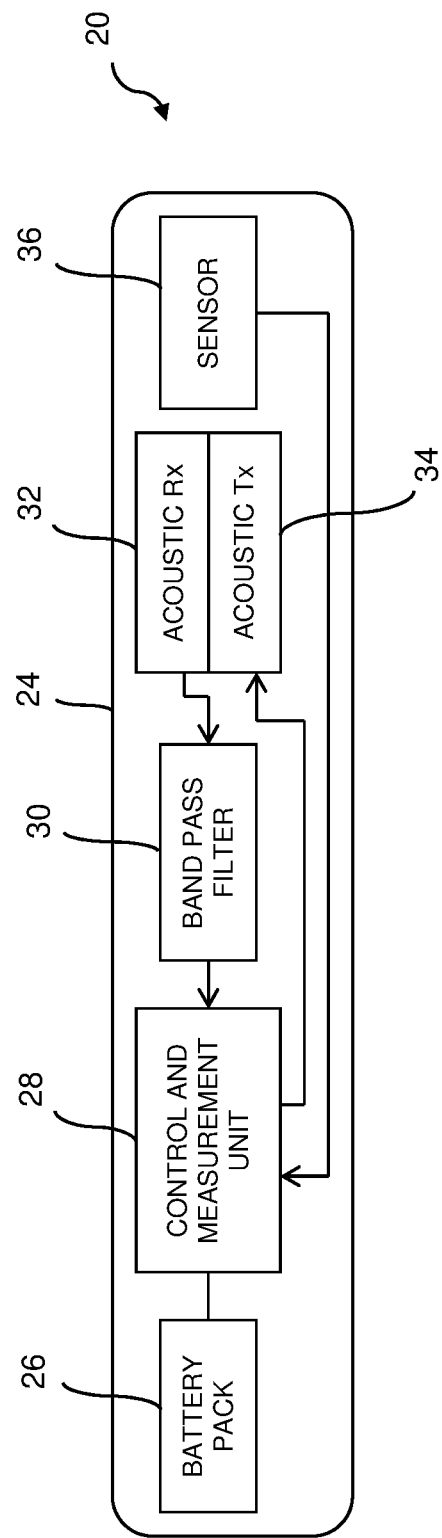
Figure 3:
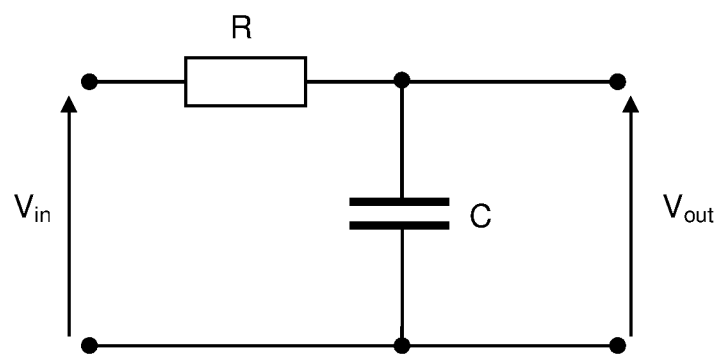
Figure 4:
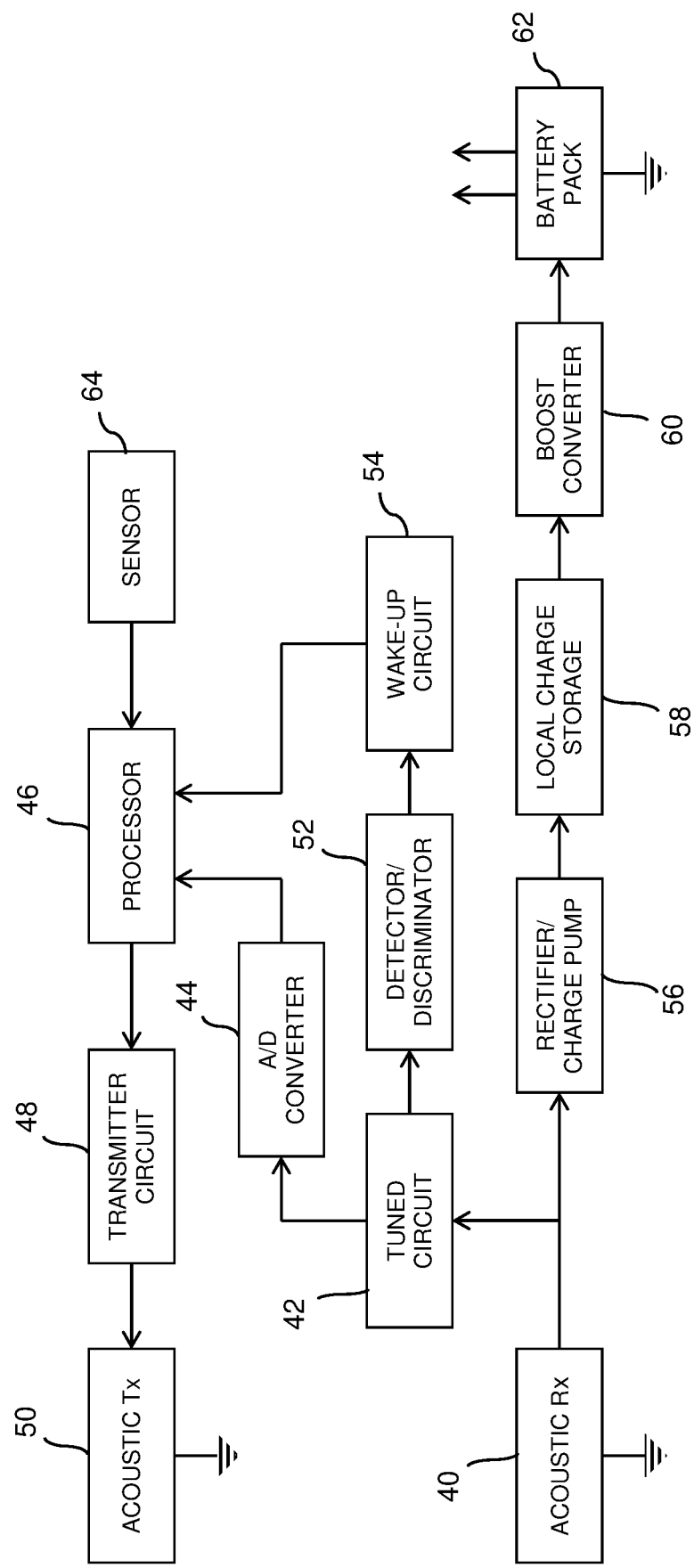
Figure 5:
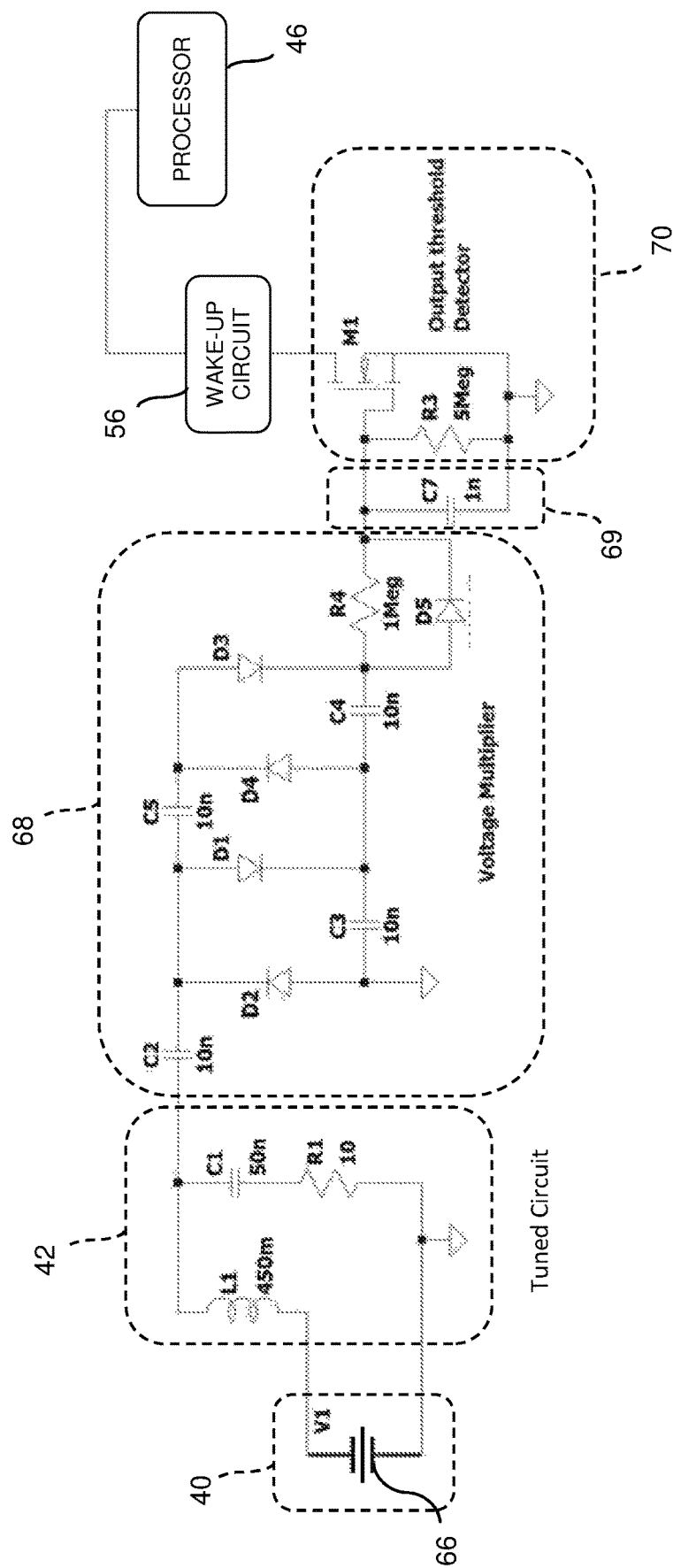
Figure 6:
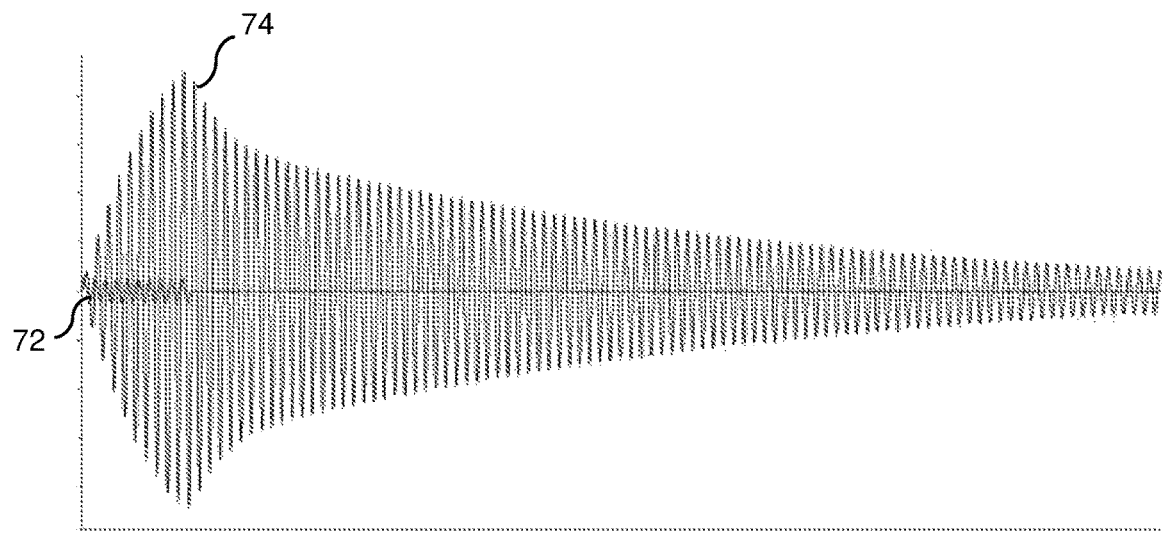
Figure 8:
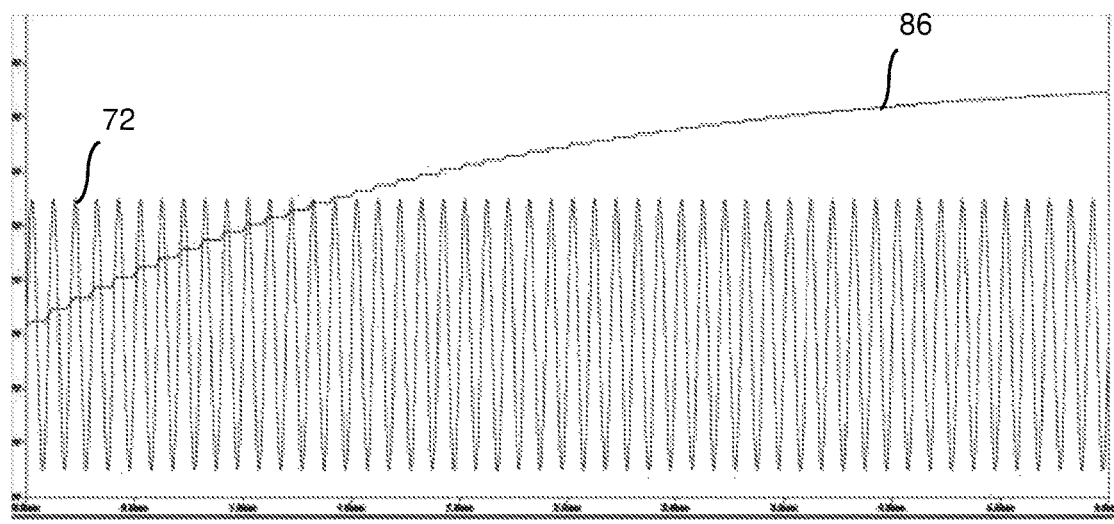
Figure 7:
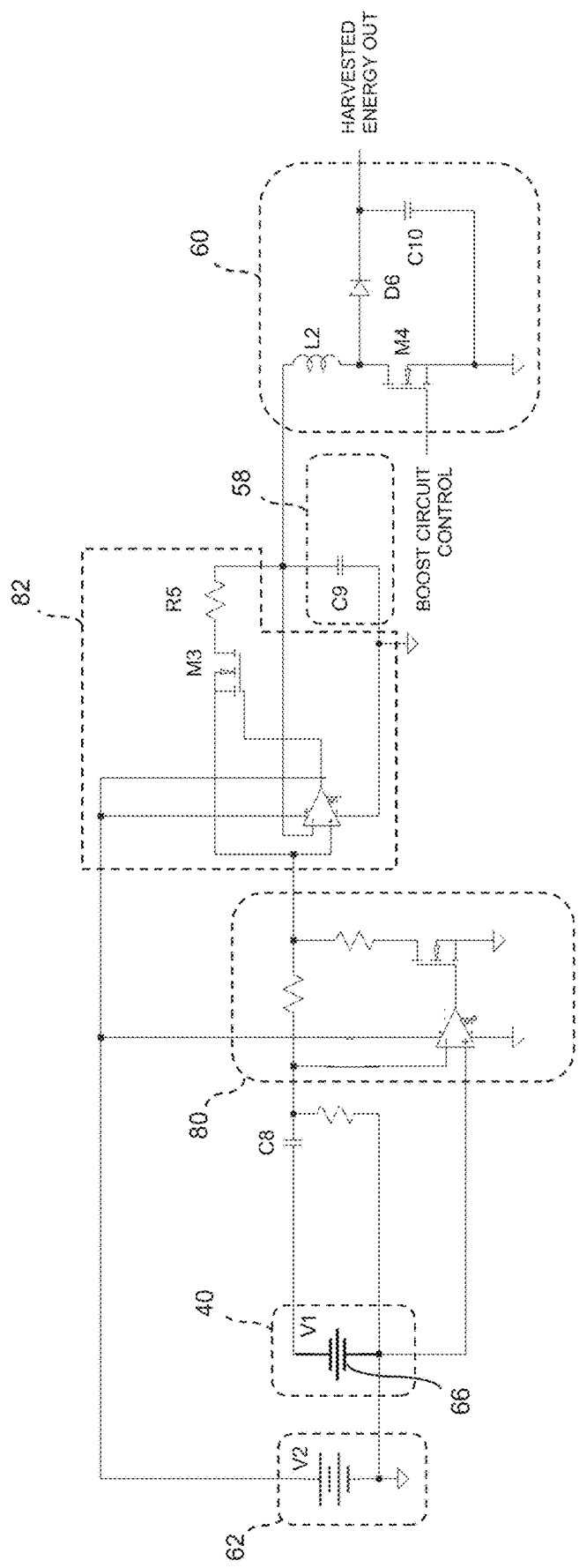
Figure 9:
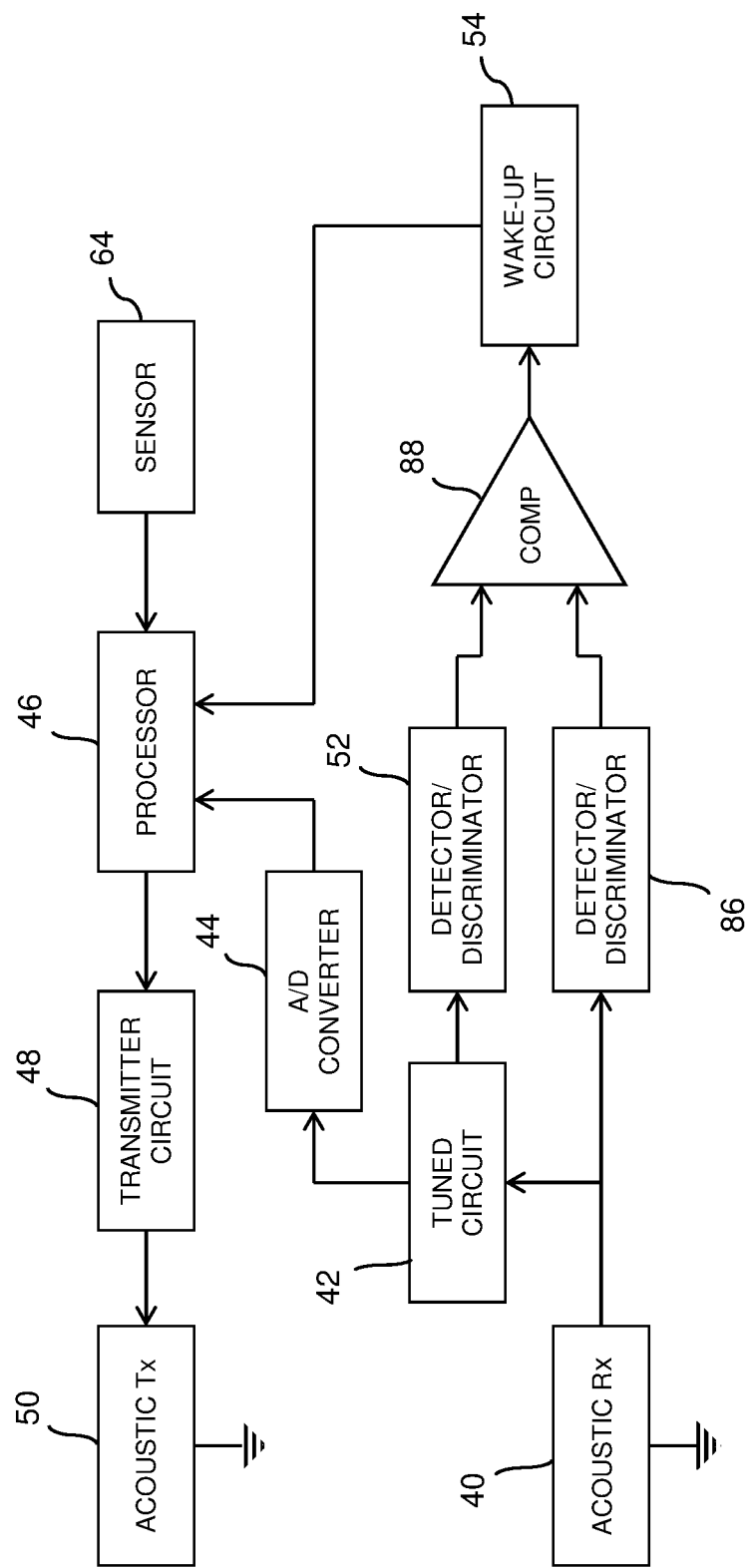

Preferred features of the present invention will now be described, purely by way of example, with reference to the accompanying drawings, in which:
  FIG. 1 shows an overview of a typical wellbore system;
  FIG. 2 shows parts of a typical repeater unit;
  FIG. 3 shows a filter circuit;
  FIG. 4 shows parts of a repeater unit in an embodiment of the invention;
  FIG. 5 shows parts of a repeater unit that may be used to trigger a wake-up in one embodiment;
  FIG. 6 illustrates a resonant behaviour of a tuned circuit;
  FIG. 7 shows parts of a repeater unit that may be used to charge a battery in one embodiment;
  FIG. 8 illustrates the build up of charge on a capacitor; and
  FIG. 9 shows parts of a repeater unit that may be used to trigger a wake-up in another embodiment.

FIG. 1 shows an overview of a typical wellbore system. Referring to FIG. 1, the wellbore system comprises wellbore 10, casing 12, well head structure 14, tubing 16, a plurality of acoustic telemetry units 18, 20, and wellhead acoustic transceiver 22. In this example the tubing 16 is production tubing, although the principles described herein may be used with any type of tubing, such as drilling tubing or production tubing, which may be permanently or temporarily deployed in the wellbore.

The plurality of acoustic telemetry units includes a sensor unit 18 and repeater units 20. The sensor unit 18 includes sensors for sensing downhole parameters such as pressure, temperature and density, and an acoustic transceiver for transmitting sensor data as acoustic signals through the tubing 16 to the wellhead transceiver 22. The repeater units 20 are provided to compensate for the decreasing strength of the acoustic signal as it travels through the tubing. The repeater units 20 boost the strength of the acoustic signal and ensure reliable transmission. If desired, the repeater units 20 may also have sensors, and may transmit their own sensor data as well as repeating the sensor data of previous units. Furthermore, data and/or commands could also be sent from the wellhead transceiver 22 to one or more of the sensor unit 18 and the repeater units 20.

Each repeater unit 20 has an acoustic transceiver for receiving acoustic signals from the previous unit in the chain. When the repeater's acoustic transceiver successfully receives an acoustic signal from the previous unit, it will re-transmit it as a series of acoustic pulses which will be received by the next repeater in the chain or the ultimate surface data logger. Any repeated data packet is altered to contain additional bytes that describe the origin of the data and the address of the repeater unit; hence a repeated signal and an original signal can be distinguished from each other.

Various systems have been devised for deploying and/or retrieving acoustic telemetry units such as those shown in FIG. 1. One such system is described in WO 2015/155617, the subject matter of which is incorporated herein by reference. In such a system, a sensor unit, an acoustic transmitting unit, a mechanical anchor and an anchor motor drive/timer are deployed into the wellbore to a given depth. After a pre-programmed delay, the anchor motor turns using batteries and the mechanical anchor is deployed. The motor assembly can then be released, either automatically or by providing a high axial force on the deployment cable in order to shear a weak link or similar release mechanism. The sensor and acoustic transceiver are left in the wellbore attached the anchor. The anchor keeps the acoustic device from falling down the wellbore and also makes good acoustic contact with the metal tubulars that line the wellbore. One or more repeater units may then be lowered down and fastened in a similar manner. The repeater units boost the signal strength and ensure reliable transmission over longer distances. The required number of repeater units and their linear separation will depend on how much the particular wellbore attenuates or distorts the acoustic signal whilst it passes along the length of the wellbore. Further techniques for deploying acoustic telemetry units are disclosed in co-pending patent application number GB 2006904.3, the subject matter of which is incorporated herein by reference.

In the arrangement of FIG. 1, each repeater unit 20 comprises an acoustic receiver and an acoustic transmitter which are acoustically coupled with the tubing 16. The acoustic receiver and acoustic transmitter may be, for example, a piezo ceramic accelerometer, a piezo ceramic actuator or any other appropriate transducer for converting acoustic energy into electrical energy or vice versa, such transducers being known in the fields of acoustics or sonar. The acoustic receiver and acoustic transmitter may be separate devices or a single device. The receiver and transmitter are typically contained in a pressure resistant housing along with sensors (e.g. pressure and/or temperature sensors), control and measurement electronics, data storage and memory. The entire unit is typically powered by a set of temperature resistant batteries.

FIG. 2 shows parts of a typical repeater unit. Referring to FIG. 2, the repeater unit 20 comprises battery pack 26, control and measurement unit 28, band pass filter 30, acoustic receiver 32, acoustic transmitter 34 and sensor 36 all of which are contained in a housing 24. The housing 24 is a pressure resistant housing suitable for deployment in a wellbore. The battery pack 26 typically comprises a set of temperature resistant electrochemical battery cells. However, other forms of energy storage, such as a rechargeable battery, one or more capacitors, or super capacitors or any combination thereof could be used as well or instead. The control and measurement unit 28 comprises a processor and associated memory which are programmed with the appropriate software to control operation of the repeater unit. The band pass filter 30 is typically an analogue circuit arranged to pass the frequencies used for acoustic data transmission. The acoustic receiver 32 and acoustic transmitter 34 are one or more transducers which convert acoustic energy into electrical energy and vice versa, and may be for example piezoelectric transducers such as a stack of piezo ceramic elements. The acoustic receiver 32 and acoustic transmitter 34 may be separate components or the same component, or a combination of the two. Some or all of the components shown in FIG. 2 may also be provided in a sensor unit 18 such as that shown in FIG. 1.

In operation, an acoustic signal is received from the wellbore tubing and converted to an electrical signal by the acoustic receiver 32. The received signal is filtered by the band pass filter 30 and passed to control and measurement unit 28. The control and measurement unit decodes the received signal to yield the transmitted data and performs any necessary processing on the data prior to retransmission. The sensor 36 senses wellbore parameters such as pressure and/or temperature, which are passed to the control and measurement unit 28 and may be added to the data to be transmitted. The processed data are then sent to the acoustic transmitter 34 where they are re-transmitted through the wellbore tubing. The battery pack 26 provides the power for the various components in the repeater unit.

In an acoustic transmission system such as that described above, acoustic transmission is typically limited to a certain range of frequencies that are known in advance or determined in situ to provide least attenuation via the wellbore tubulars. However, the acoustic vibrations present in the wellbore extend over a wide range of frequencies and may be caused variously by fluid flow and mechanical equipment. For this reason, the received acoustic signal will pass through the bandpass filter 30 and/or an anti-aliasing filter in order to reject frequencies that are not of interest. The filter 30 typically comprises analogue electronic circuits that are known in the field of signal processing.

Prolonging the useful life of the equipment in the wellbore is often an economic and logistical necessity and it may be possible to obtain several years of battery life by careful electronic design. One known technique involves the electronics entering a low power "sleep" mode when there is no planned activity. The circuits are placed in a low power mode and a separate alarm clock circuit running on very low power is programmed to wake up the main processor at a pre-determined time. A disadvantage of this arrangement is that the controlling algorithms must know in advance when, for example, they are likely to receive a signal from another repeater unit that they themselves are required to repeat, which limits the flexibility of the system. Furthermore, the timing may be perturbed by temperature effects causing the electronic clocks on each unit to drift at different rates. Running the alarm clock and waking up early enough to compensate for potential drift are undesirable uses of battery power.

In the design of a typical analogue anti-aliasing filter or a band pass filter, the energy of electrical currents at the unwanted frequencies of the signal are grounded and therefore ultimately dissipated as heat. For example, in the filter circuit shown in FIG. 3 for anti-aliasing (low pass filter), higher frequency currents see a path of low impedance through the capacitor C. Therefore, these currents will be effectively shorted to ground via the resistor R.

In embodiments of the present invention raw analogue signals from an acoustic receiver (or combined receiver/transmitter) are filtered in such a way as to trigger a wake-up alarm and simultaneously top up the battery charge. The battery charge may also be topped up when the unit is not in sleep mode.

FIG. 4 shows parts of a repeater unit in an embodiment of the invention. Referring to FIG. 4, the repeater unit comprises acoustic receiver 40, tuned circuit 42, analogue-to-digital converter 44, processor 46, transmitter circuit 48, acoustic transmitter 50, detector/discriminator 52, wake-up circuit 54, rectifier/charge pump 56, charge storage device 58, boost converter 60, battery pack 62 and sensor 64. The acoustic receiver 40, tuned circuit 42, analogue-to-digital converter 44, processor 46, transmitter circuit 48, acoustic transmitter 50, battery pack 62 and sensor 64 may be the same as or similar to the corresponding parts shown in FIG. 2.

In operation, an acoustic signal is received from the wellbore tubing and converted to an electrical signal by the acoustic receiver 40. The received signal passes to the tuned circuit 42 where the frequencies of interest, corresponding to the transmitted frequencies from an adjacent unit, are selected. The filtered signals are passed to analogue-to-digital converter 44 where they are digitised. The digitised signals are passed to processor 46, which decodes the signal to obtain the data transmitted in the acoustic signal. The processor 46 may also perform other processing, for example, to add additional bytes that describe the origin of the data and the address of the repeater unit. Optionally, measurements from the sensor 64 may be added to the data. The data are stored in memory for subsequent retrieval and/or retransmission. Data for retransmission are re-coded and sent to the transmitter circuit 48. The transmitter circuit 48 drives the acoustic transmitter 50 in order to transmit an acoustic signal containing the data through the wellbore tubing to a subsequent unit. The battery pack 62 provides power for the various components in the repeater unit. The repeater unit is housed in a housing such as the housing 24 shown in FIG. 2.

In FIG. 4, the acoustic receiver 40 and acoustic transmitter 50 are shown separately for clarity. However, the receiver 40 and transmitter 50 could be the same device connected to both the receive and transmit circuits. The receiver and/or transmitter may comprise for example a stack of piezoelectric elements, or any other appropriate transducer for converting acoustic signals to electrical signals, such devices being known in the art. In addition, rather than a battery pack, other types of energy storage, such as one or more one or more capacitors or super capacitors could be used as well as or instead.

The repeater unit shown in FIG. 4 is operable in a low power "sleep" mode. This mode may be activated by turning off the power to certain components, such as the processor 46, the analogue-to-digital converter 44 and transmitter circuit 48. Alternatively, or in addition, the processor may have a built-in sleep mode which is activated by applying a signal to one of its pins. The sleep mode may be entered, for example, when the repeater unit has not received any signals for retransmission for a predetermined period of time and/or in response to a command generated either locally or remotely. The sleep mode allows battery life to be extended by reducing or turning off the power to components when they are not needed.

When the repeater unit is the sleep mode, energy from frequencies that are not of interest (e.g. background noise) is still put towards charging the battery. However, if an adjacent repeater unit transmits, the frequencies of interest generate a small amount of charge that is stored in the detector/discriminator 52. Once this charge (on a capacitor) generates enough voltage to reach a pre-determined threshold (indicating that this is a real persistent transmission and not coincidental random noise) then the detector/discriminator 52 triggers the wake-up circuit 54. This turns on the battery power to the processor 46 and any other components which are in the sleep mode. Alternatively, where the processor 46 has a built-in sleep mode, the wake-up circuit 54 places a voltage on the appropriate pin to send a wake-up command.

FIG. 5 shows in more detail parts of a repeater unit that may be used to trigger a wake-up in one embodiment. Referring to FIG. 5, the unit comprises acoustic receiver 40, tuned circuit 42, voltage multiplier 68, storage device 69, threshold detector 70, wake-up circuit 56 and processor 46. In the example of FIG. 5, the acoustic receiver 40 comprises a piezoceramic stack 66 which produces a voltage V1. The voltage V1 is applied to the tuned circuit 42, which comprises inductor L1, capacitor C1 and resistor R1. The value of the inductor L1 is chosen such that the tuned circuit has a passband corresponding to the frequencies used for acoustic transmission by an adjacent acoustic telemetry unit. The centre frequency f of the tuned circuit is given by:

$$f = \frac{1}{2\pi\sqrt{L_1 C_1}}$$

where $C_1$ is the representative capacitance of the piezoceramic stack 66. It will be understood that this is a first approximation only as the equivalent circuit of the piezoceramic stack is more complex owing to its coupling with the mechanical system around it.

Inductor L1 and Capacitor C1 form a parallel resonator. In this way, low voltage oscillations on the piezoceramic stack 66 can build to a higher level at the output of the tuned circuit (the junction of C1 and C2 in FIG. 5). This principle is illustrated in FIG. 6, where the line 72 represents the voltage V1 at the piezoceramic stack 66 and the line 74 represents the voltage at the output of the tuned circuit 42. The choice of L1 and C1 together with the properties of the piezoceramic stack 66 can tune this resonant behaviour to a range of frequencies of interest.

Referring back to FIG. 5, the output of the tuned circuit 42 is fed to the voltage multiplier 68. The voltage multiplier 68 comprises a series of capacitor-diode stages known as a Cockroft-Walton multiplier. The function of the voltage multiplier is to convert the low alternating voltage present on the tuned circuit 42 to a higher voltage. The output of the voltage multiplier 68 is rectified by the diode D5 and fed to the storage device 69. The storage device 69 comprises capacitor C7, which stores the charge produced at the output of the voltage multiplier 68. The threshold detector 70 is connected to the storage device 69 and detects when a voltage of the storage device exceeds a threshold. In the arrangement shown, the threshold detector comprises a switching device which in this example is a MOSFET M1. When and if an adequate voltage is present on the capacitor C7, the MOSFET M1 turns on, triggering the wake-up circuit 56. The wake-up circuit 56 then turns on the processor 46 and associated peripherals, along with any other components which are in sleep mode, by connecting power and/or by applying a wake-up signal to the appropriate pin on the processor.

Referring back to FIG. 4, the received signals from the acoustic receiver 40 pass through the tuned circuit 42, where the frequencies of interest, corresponding to the transmitted frequencies from the adjacent unit, are selected, before being digitized by the analogue-to-digital converter 44 and processed using the processor 46. Signals from the receiver that are not of interest are passed to a rectifier or charge pump 56, and the small amounts of charge are stored on the charge storage device 58 which is typically a capacitor. The boost convertor 60 drains the charge from the charge storage device 58 and uses it to charge the rechargeable battery pack 62 or capacitor stack. In this way, signals which are not of interest and which would otherwise be wasted can be used to charge the battery pack 62, thereby extending its life. The battery pack 62 is used to power the other components shown in the diagram, but for clarity the interconnections are not drawn. The battery pack 62 will typically contain a charging circuit which monitors the battery to prevent overcharging.

FIG. 7 shows parts of a repeater unit that may be used to convert signals outside of the passband of the tuned circuit into energy to charge the battery in one embodiment. Referring to FIG. 7, the unit comprises battery pack 62, acoustic receiver 40, first charge pump stage 80, second charge pump stage 82, charge storage device 58 and boost converter 60. The first charge pump stage 80, second charge pump stage 82 may be part of the rectifier/charge pump 56 shown in FIG. 4. In this embodiment the acoustic receiver 40 comprises a piezoceramic stack 66 which produces a voltage V1. The battery pack 62 produces a voltage V2 which is used to power electrical components in the repeater unit.

In operation, acoustic noise produced by the piezoceramic stack 66 is presented as small AC currents that are coupled into the first charge pump stage 80 via the capacitor C8. In the first charge pump stage 80, the amplifier U1 and the MOSFET M2 operate together to create the same effect as a semiconductor diode (conducting in one direction only). The advantage over a conventional diode is that they can be arranged to conduct with only very small voltages present at the input and thus avoid the situation where the circuit will not start to charge until the voltage at the input is greater than the junction potential (0.7V typically for a silicon diode). The second charge pump stage 82 comprises amplifier U4 and the MOSFET M3 which operate in a similar way. The two charge pump stages 80, 82 operate hand-in-hand to charge the charge storage device 58. One charge pump stage conducts for the negative half of any AC voltage signals from the piezoceramic stack 66 and the other pump stage conducts for the positive half. The charge storage device 58 comprises reservoir capacitor C9. The two charge pump stages are connected to the capacitor C9 in such a way that both negative and positive potentials across the piezoceramic stack 66 are presented to the capacitor C9 the same way around, so that each cycle adds to the other and does not cancel it out. The effect is that, as the oscillations on the piezoceramic stack 66 continue, the charge on the reservoir capacitor C9 monotonically increases.

An example of the resultant voltage on the capacitor C9 is shown in FIG. 8. In FIG. 8, the line 72 represents the voltage V1 at the piezoceramic stack 66 and the line 86 represents the voltage on the reservoir capacitor C9.

Once the charge on the capacitor C9 has built up to a sufficient level, it can be discharged into the rechargeable batteries in the battery pack 62. Depending on the type of battery or circuit that is required to be powered from the reservoir capacitor C9 (which would normally include the battery pack 62), the charge pump stages 80, 82 may be enough to bring the voltage on the reservoir capacitor C9 to the required level. However, in practice, the voltage on the reservoir capacitor C9 may be different from that required to charge an electrochemical cell or other device. For this reason, the circuit may also include the boost converter 60 shown in FIG. 7. The boost converter 60 is a DC to DC converter which converts the voltage on the capacitor C9 to a higher voltage sufficient to charge the rechargeable batteries in the battery pack 62. The boost converter 60 uses inductor L2, diode D6, MOSFET M4 and capacitor C10. Boost converters such as that shown in FIG. 7 are known in the art. In this example, the control to the MOSFET M4 operates periodically, when sufficient charge is available on C9, and is controlled by a microprocessor or specialist IC. The overall effect of the boost converter is that the charge on the capacitor C9 can be slowly drained and presented at 'harvested energy out' at a required voltage level. The exact voltage is determined by the frequency of switching of M4, the voltage stored on C9 and the value of L2. The output voltage is then used to charge rechargeable batteries in the battery pack 62.

FIG. 9 shows parts of a repeater unit that may be used to trigger a wake-up in another embodiment. Referring to FIG. 9, the repeater unit comprises acoustic receiver 40, tuned circuit 42, analogue-to-digital converter 44, processor 46, transmitter circuit 48, acoustic transmitter 50, detector/discriminator 52 and wake-up circuit 54, which may be the same as or similar to the corresponding parts shown in FIG. 4. In addition, the repeater unit of FIG. 9 includes a second detector/discriminator 86 and a comparator 88.

When the repeater unit is the sleep mode, the frequencies of interest that are passed by the tuned circuit 42 generate a small amount of charge that is stored in the first detector 52. In addition, frequencies outside of the pass band of the tuned circuit 42 generate charge that is stored in the second detector 86. The amounts of charge stored in the first and second detectors 52, 86 are compared by the comparator 88. If the difference is above a predetermined threshold value, then the frequencies within the passband of the tuned circuit 42 are sufficiently above the background noise of frequencies outside of the passband to indicate that an acoustic signal is being transmitted by an adjacent transmission unit. In this case, the comparator 88 triggers the wake-up circuit 54. This turns on the battery power to the processor 46 and any other components which are in the sleep mode and/or places a voltage on the appropriate pin of the processor to send a wake-up command. Although not shown in FIG. 9, energy from frequencies outside of the passband of the tuned circuit 42 can also be put towards charging the battery in a similar way to the arrangement described above with reference to FIGS. 4 and 7.

The arrangement of FIG. 9 can help to prevent false wake-up signals from being generated due to acoustic events which extend over a wide range of frequencies and which may be caused, for example, by mechanical equipment or fluid flow.

The embodiments described above can allow raw analogue signals from the acoustic receiver (or combined receiver/transmitter) to be filtered in such a way as to trigger a wake-up alarm and simultaneously top up the battery charge. The unit will be woken up when signals are received from an adjacent downhole unit. This can allow the unit to be woken up only when it is required for data transmission. This may be achieved using components (the acoustic receiver and tuned circuit) which are already being used for data transmission. Furthermore, the energy harvesting can be achieved using what would other be wasted energy from the acoustic receiver that is already being used for acoustic transmission. The battery charge may also be topped up when the unit is not in sleep mode. Thus, the present embodiments can allow the battery life of a downhole unit to be extended without adding significant cost or complexity to the system.

In alternative embodiments, other types of analogue filter and/or a digital filter could be used as well as or instead of the tuned circuit described above. In the case of a digital filter, an output of the digital filter could be fed to a digital detector/discriminator circuit. Such a circuit may, for example, integrate the output of the digital filter over time and trigger the wake-up circuit when the integrated output exceeds a threshold, indicating that a real persistent transmission is present.

Preferred features of the invention have been described above by way of example with reference to various embodiments. It will be appreciated that the invention is not limited to these embodiments, and variations in detail may be made. For example, features of one embodiment may be applied to another other embodiment. Various other modifications and variations will be apparent to the skilled person within the scope of the appended claims.

The invention claimed is:

1. An acoustic telemetry unit comprising:
    an acoustic receiver arranged to receive acoustic telemetry signals;
    a filter arranged to filter signals received by the acoustic receiver;
    a processor arranged to process a signal passed by the filter to recover a data signal, the processor being operable in a sleep mode;
    a detector arranged to detect the signal passed by the filter; and
    a wake-up circuit arranged to wake the processor from the sleep mode when the detector detects the signal passed by the filter.

2. The acoustic telemetry unit according to claim 1, wherein the filter has a passband corresponding to frequencies used for acoustic communication.

3. The acoustic telemetry unit according to claim 1, wherein the filter is a passive filter.

4. The acoustic telemetry unit according to claim 3, wherein the filter is a tuned circuit with a resonant frequency corresponding to frequencies used for acoustic communications.

5. The acoustic telemetry unit according to claim 1, wherein the detector is arranged to detect when a time integration of the signal passed by the filter is above a predetermined threshold.

6. The acoustic telemetry unit according to claim 1, wherein the detector comprises an energy storage device arranged to store electrical energy passed by the filter.

7. The acoustic telemetry unit according to claim 6, wherein the detector comprises a threshold detector arranged to detect when the electrical energy stored on the energy storage device exceeds a threshold.

8. The acoustic telemetry unit according to claim 1, wherein the detector comprises a switching device arranged to turn on the wake-up circuit when the signal passed by the filter is detected.

9. The acoustic telemetry unit according to claim 1, wherein the detector is arranged to compare the signal passed by the filter to a signal which is received by the acoustic receiver and not passed by the filter.

10. The acoustic telemetry unit according to claim 1, further comprising a voltage multiplier arranged to multiply a voltage at an output of the filter.

11. The acoustic telemetry unit according to claim 1, further comprising:
    an energy storage module arranged to supply electrical power to the acoustic telemetry unit; and
    a charge circuit arranged to charge the energy storage module using signals received by the acoustic receiver which are not passed by the filter.

12. The acoustic telemetry unit according to claim 11, wherein the charge circuit comprises a charge storage device arranged to store charge produced by the signals received by the acoustic receiver which are not passed by the filter.

13. The acoustic telemetry unit according to claim 12, further comprising an alternating current (AC) to direct current (DC) converter arranged to convert an AC signal received by the acoustic receiver to a DC signal for supply to the charge storage device.

14. The acoustic telemetry unit according to claim 1, wherein the acoustic receiver comprises a transducer arranged to convert acoustic signals to electrical signals.

15. The acoustic telemetry unit according to claim 1, wherein the acoustic telemetry unit is for use in a wellbore.

16. The acoustic telemetry unit according to claim 1, wherein the acoustic telemetry unit is an acoustic repeater.

17. A method of operating an acoustic telemetry unit, the method comprising steps of:
    receiving acoustic telemetry signals;
    filtering, by a filter, the acoustic telemetry signals received in the receiving step;
    processing a signal passed by the filter in the filtering step to recover a data signal;
    detecting the signal passed by the filter; and
    waking the acoustic telemetry unit from a sleep mode when the signal passed by the filter is detected.

18. The method according to claim 17, further comprising:
    supplying power to the acoustic telemetry unit from an energy storage module; and
    charging the energy storage module using signals which are not passed by the filter in the filtering step.

* * * * *